(12) United States Patent
Nishikawa et al.

(10) Patent No.: US 12,172,940 B2
(45) Date of Patent: Dec. 24, 2024

(54) APPARATUS AND METHOD FOR MANUFACTURING PROPELLANT

(71) Applicant: MITSUBISHI HEAVY INDUSTRIES, LTD., Tokyo (JP)

(72) Inventors: Seiki Nishikawa, Tokyo (JP); Chiyako Mihara, Tokyo (JP); Tasuku Suzuki, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 856 days.

(21) Appl. No.: 17/354,310

(22) Filed: Jun. 22, 2021

(65) Prior Publication Data

US 2021/0395162 A1 Dec. 23, 2021

(30) Foreign Application Priority Data

Jun. 23, 2020 (JP) ................................. 2020-108060

(51) Int. Cl.
*C06B 21/00* (2006.01)
*F02K 9/10* (2006.01)

(52) U.S. Cl.
CPC ............ *C06B 21/0058* (2013.01); *F02K 9/10* (2013.01)

(58) Field of Classification Search
None
See application file for complete search history.

(56) References Cited

U.S. PATENT DOCUMENTS 3,116,597 A * 1/1964 Preckel ................... C08F 20/34
149/93
3,518,916 A * 7/1970 Minnich ................... F02K 9/24
156/172

(Continued)

FOREIGN PATENT DOCUMENTS

JP 2007-514125 5/2007
JP 2008-280967 11/2008

(Continued)

OTHER PUBLICATIONS

Office Action issued Jul. 13, 2023 in corresponding Japanese Patent Application No. 2020-108060, with English translation.

(Continued)

*Primary Examiner* — Aileen B Felton
(74) *Attorney, Agent, or Firm* — Wenderoth, Lind & Ponack, L.L.P.

(57) ABSTRACT

A propellant manufacturing method for manufacturing a propellant including a propellant grain having a first surface on which combustion starts upon ignition and a second surface to be coupled to a wall surface that prevents combustion. The manufacturing method includes placing a portion of first propellant having a first burning rate in a first space containing a first position on the second surface; and placing a portion of second propellant having a second burning rate higher than the first burning rate in a second space containing a second position on the first propellant. The method further includes placing a portion of third propellant having a third burning rate higher than the second burning rate in a third space containing a third position on the first propellant. The method further includes completing the propellant grain by simultaneously hardening the entireties of the first propellant, the second propellant, and the third propellant.

12 Claims, 11 Drawing Sheets

(56) References Cited

U.S. PATENT DOCUMENTS

| | | | |
|---|---|---|---|
| 3,555,816 | A | 1/1971 | Leasure, Jr. et al. |
| 10,843,979 | B2 | 11/2020 | Durand et al. |
| 2008/0047453 | A1 | 2/2008 | Dahlberg |
| 2010/0218481 | A1 | 9/2010 | Mihara et al. |
| 2012/0097060 | A1 | 4/2012 | Dahlberg |
| 2013/0118147 | A1 | 5/2013 | Mihara et al. |
| 2014/0227548 | A1* | 8/2014 | Myrick ............... C10L 1/28 203/40 |
| 2015/0284301 | A1 | 10/2015 | Durand et al. |
| 2018/0273193 | A1* | 9/2018 | Summers ............ F02K 9/08 |
| 2019/0094000 | A1* | 3/2019 | Abel ............... F42B 33/02 |
| 2019/0100474 | A1 | 4/2019 | Straathof et al. |

FOREIGN PATENT DOCUMENTS

| | | |
|---|---|---|
| JP | 2016-534313 | 11/2016 |
| JP | 6524083 | 6/2019 |
| JP | 2019-183763 | 10/2019 |
| JP | 6587231 | 10/2019 |
| WO | 2017/164732 | 9/2017 |
| WO | 2018/167603 | 9/2018 |

OTHER PUBLICATIONS

Office Action issued May 2, 2024 in corresponding Japanese Patent Application No. 2020-108060, with English translation.

* cited by examiner

APPARATUS AND METHOD FOR MANUFACTURING PROPELLANT

CROSS REFERENCE

This application claims priority of Japanese Patent Application No. 2020-108060, filed on Jun. 23, 2020, the disclosure of which is incorporated herein by reference.

TECHNICAL FIELD

The present invention relates to a propellant manufacturing method and a propellant manufacturing apparatus, which can be advantageous for manufacturing a propellant used for example in rocket motors and gas generators of missiles.

BACKGROUND

A rocket motor or gas generator using solid propellant may be used for a missile or the like. In general, solid propellant is manufactured as single composition propellant. Solid propellant may be shaped through casting after mixing ingredients.

A rocket motor or gas generator, which is configured to generate combustion gas by combusting propellant in a pressure vessel, can obtain propulsion by exhausting the combustion gas from a nozzle. The combustion pressure generated by the combustion gas varies depending on the area of the combusting surface on which the propellant is combusted. When the propellant is simply shaped in a cylindrical shape and the combustion proceeds on the inner side face thereof, for example, the combustion pressure increases as the combustion proceeds since the area of the combusting surface increases. The pressure vessel should be structured to bear the maximum combustion pressure. Accordingly, the mass of the pressure vessel increases as the maximum combustion pressure increases. Reduction in the mass of the pressure vessel is desired to improve the performance of a rocket motor or gas generator.

The mass of the pressure vessel can be reduced by reducing the maximum combustion pressure. As one approach to achieve this, the propellant may be shaped to have a recess, such as a slot and a star perforation. In this case, since the combustion proceeds on the surface of the slot or star perforation, the combustion pressure at the start of the combustion is higher than that of the propellant with the simple cylindrical shape. The area of the combusting surface then varies depending on the shape of the slot or star perforation as the combustion proceeds, and therefore the difference in the area of the combusting surface between the start of the combustion and the end of the combustion can be reduced compared to the propellant with the simple cylindrical shape. As a result, the time-dependent changes in the combustion pressure can be reduced compared to the propellant with the simple cylindrical shape. Meanwhile, the amount of the propellant that can be mounted on the rocket motor is reduced due to the slot or star perforation. Mounting an increased amount of propellant is desired to improve the performance of a rocket motor or gas generator.

In relation to the above discussion, Japanese Patent Gazette No. 6587231 discloses a multi-pulse rocket motor. The disclosed multi-pulse rocket motor includes a pressure vessel, three or more hollow cylindrical propellants, a nozzle, an ignition device, and a barrier membrane member. The propellants are arrayed in the pressure vessel in the longitudinal direction of the pressure vessel. The nozzle is disposed at the aft end of the pressure vessel. To produce desired propulsion at desired multiple timings, the ignition device ignites the respective propellants in the pressure vessel, the number of the ignited propellants being depending on generation of the desired propulsion. The barrier membrane member separates ones of the propellants other than a first propellant of the propellants from each other in the pressure vessel. The multi-pulse rocket motor is characterized in that the barrier membrane member has a weakened portion that is weaker than the rest of the barrier membrane member, the weakened portion being extended over the entirety of the barrier membrane member.

Further, Japanese Patent Gazette No. 6524083 discloses a method of manufacturing multi-layered propellant grains. This method includes providing a first propellant formulation and providing a die configured to provide a structure having an outer shell and a hollow interior when material is extruded therethrough. The method further includes extruding the first propellant formulation through the die to produce a first propellant layer having an outer shell defining a hollow interior in the form of a passageway having open ends; and providing a second propellant formulation which is low viscosity gel, liquid or paste with a viscosity in the range of 0 to 2000 pascal seconds during the extrusion. The viscosity of the second propellant formulation during the extrusion is lower than the viscosity of the first propellant formulation during the extrusion. The method further includes: injecting the second propellant formulation into a passageway defined by the first propellant layer to form a second propellant layer disposed in the passageway, wherein the second propellant formulation is low viscosity gel, liquid or paste immediately after the injection into the passageway and the injecting of the second propellant formulation is performed at substantially the same time as the extruding of the first propellant formulation; and hardening the second propellant layer after the injecting such that the second propellant layer obtains a larger viscosity than the low viscosity enough to prevent flowing of the second propellant layer in the passageway. The first and second propellant layers have different burning rates.

Japanese Patent Gazette No. 6524083 discloses a method for multi-layering of propellants. The method disclosed this patent document involves repeatedly casing propellants after individually hardening the propellants. Accordingly, the propellants are shaped to be layered stepwise. The method disclosed in Japanese Patent Gazette No. 6524083, which requires repeating a series of steps of mixing ingredients, casing, and hardening each when a layer is added, suffers from increased manufacturing costs. Furthermore, the first-formed layer is subjected to hardening multiple times and the increase in the number of times of hardening enhances deterioration of the propellant. Furthermore, it is considered difficult to sufficiently reduce the thicknesses of the respective layers in view of leveling of the combustion pressure.

SUMMARY

From the above-described viewpoints, provided herein are a propellant manufacturing method and a propellant manufacturing apparatus for manufacturing a rocker motor or gas generator with higher performance. Other objectives and new features would be understood from the description herein and the attached drawings.

In one embodiment, a propellant manufacturing method is a method for manufacturing a rocket motor including a propellant grain having a first surface on which combustion starts upon ignition and a second surface coupled to a wall surface that prevents the combustion. The manufacturing method includes: placing a portion of a first propellant having a first burning rate in a first space containing a first position on the second surface; and placing a portion of a second propellant having a second burning rate higher than the first burning rate in a second space containing a second position on the first propellant. The manufacturing method further includes a portion of a third propellant having a third burning rate higher than the second burning rate in a third space containing a third position on the first surface. The manufacturing method further includes completing the propellant grain by simultaneously and completely hardening the entireties of the first propellant, the second propellant, and the third propellant.

In one embodiment, a propellant manufacturing apparatus is configured to manufacture a propellant grain having a first surface on which combustion starts upon ignition and a second surface coupled to a wall surface that prevents the combustion. In a first aspect, the propellant manufacturing apparatus includes a support device, a head, a head moving device, a control device, and a hardening device. The support device is configured to support the wall surface. The head is configured to place first propellant in a space that contains a position on the wall surface. The head is further configured to place a second propellant and a third propellant in a predetermined space containing a predetermined position under control of the control device. The second propellant has a different burning rate from that of the first propellant, and the third propellant has a different burning rate from those of the first propellant and the second propellant. The head moving device is configured to move the head to adjust the position of the head with respect to the wall surface. The control device is configured to control the support device, the head, and the head moving device. The hardening device is configured to complete a propellant grain by simultaneously and completely hardening the entireties of the first propellant, the second propellant, and the third propellant.

The above-described embodiments allow manufacturing propellant for a rocket motor or gas generator with higher performance.

DETAILED DESCRIPTION

A description is given below of embodiments for implementing a propellant manufacturing method and a propellant manufacturing apparatus according to the present invention with reference to the attached drawings. Although the respective embodiments describe propellant used for a rocket motor, it is noted that similarly configured propellant may be used for a gas generator.

First Embodiment

Figure 1:
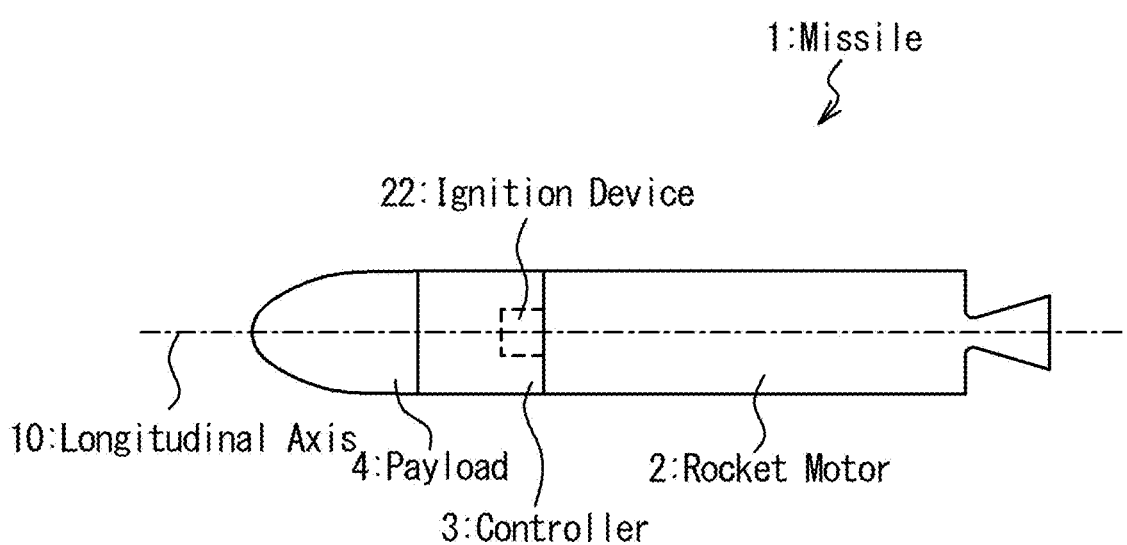
FIG. 1 is a section view illustrating one example configuration of a fling object, according to one embodiment.

Referring to FIG. 1, it is described that a rocket motor with propellant manufactured by a propellant manufacturing method and a propellant manufacturing apparatus according to this embodiment can be used, for example, for a missile. FIG. 1 is a section view illustrating one example configuration of a missile 1, according to one embodiment. The missile 1 of FIG. 1 includes a rocket motor 2, a control device 3, and a payload 4. The rocket motor 2 includes an ignition device 22 configured to ignite propellant disposed in the rocket motor 2. The ignition device 22 may be controlled by the control device 3. The missile 1 of FIG. 1 is configured to carry the payload 4 to a destination using propulsion produced by the rocket motor 2. The shape of the missile 1 may be rotationally symmetric around a longitudinal axis 10.

Figure 2A:
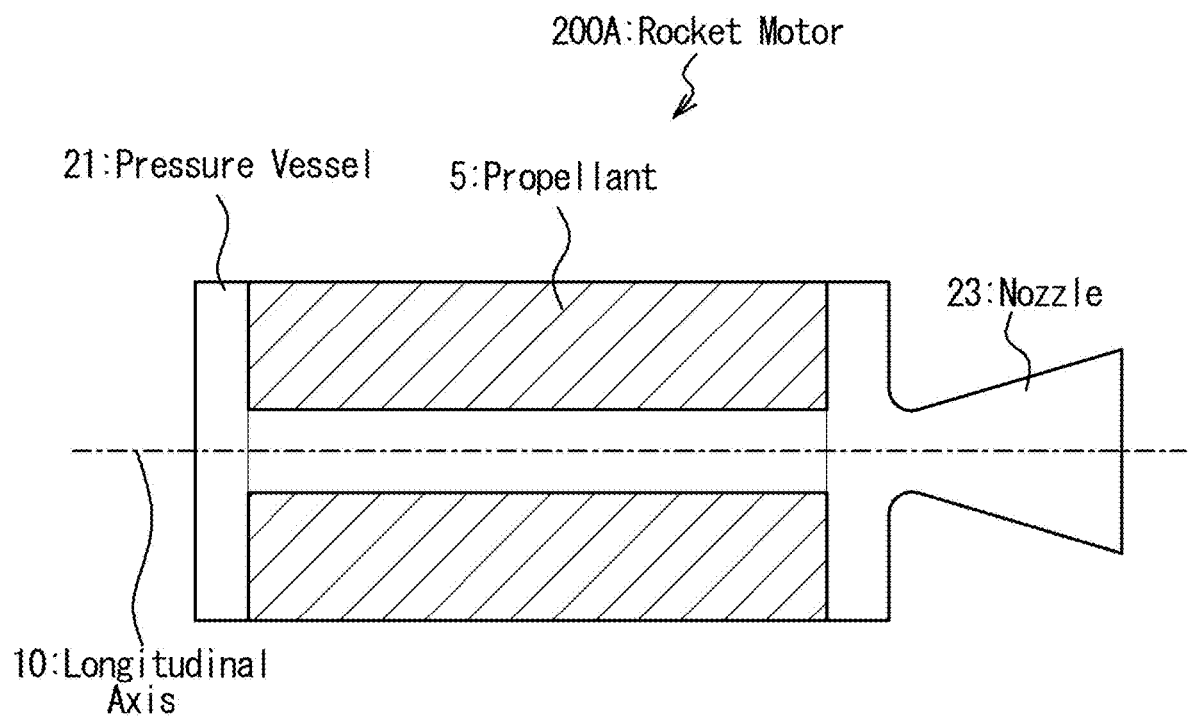
FIG. 2A is a section view illustrating one example configuration of a rocket motor, according to a related art.
Figure 2B:
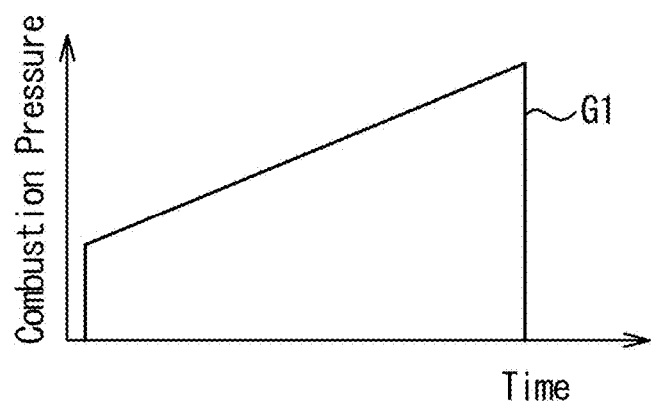
FIG. 2B is a graph illustrating one example of time-dependent changes in the combustion pressure during the operation of the rocket motor of FIG. 2A.

For thorough understanding of the propellant manufacturing method and the propellant manufacturing apparatus according to this embodiment, a description is first given of a rocket motor according to a related art with reference to FIG. 2A and FIG. 2B.

FIG. 2A is a section view illustrating one example configuration of a rocket motor 200A, according to the related art. The rocket motor 200A of FIG. 2A includes a pressure vessel 21, a nozzle 23, and propellant 5. The pressure vessel 21 of FIG. 2A is shaped in a cylindrical shape, one end of the pressure vessel 21 being open to the exterior through the nozzle 23. An ignition device 22 (not illustrated) is disposed at the other end of the pressure vessel 21. The propellant 5 is shaped in a cylindrical shape, having an outer side surface, an inner side surface located close to the nozzle 23, and another end surface located close to the ignition device 22. The propellant 5 is disposed in the pressure vessel 21 and the outer side surface of the propellant 5 is in contact with the internal wall of the pressure vessel 21. When the ignition device 22 ignites the propellant 5, the combustion starts on the inner side surface and both the end surfaces of the propellant 5, as the inner surface and the end surfaces are exposed.

FIG. 2B is a graph G1 illustrating one example of time-dependent changes in the combustion pressure of the rocket motor 200A of FIG. 2A during the operation. In the graph G1 of FIG. 2B, the horizontal axis represents the time, and the vertical axis represents the combustion pressure in the pressure vessel 21. The shape of the propellant 5 changes as the combustion of the propellant 5 proceeds. It is especially noted that the area of the inner side surface of the propellant 5 increases. The combustion pressure increases as the combustion area of the propellant 5 increases. The continuous increase in the combustion pressure continues until the combustion of the propellant 5 completes.

The pressure vessel 21 should be structured to bear the maximum combustion pressure. Accordingly, the mass of the pressure vessel 21 increases as the maximum combustion pressure increases. Reduction in the mass of the pressure vessel 21 is desired to improve the performance of the rocket motor 200A.

Figure 3A:
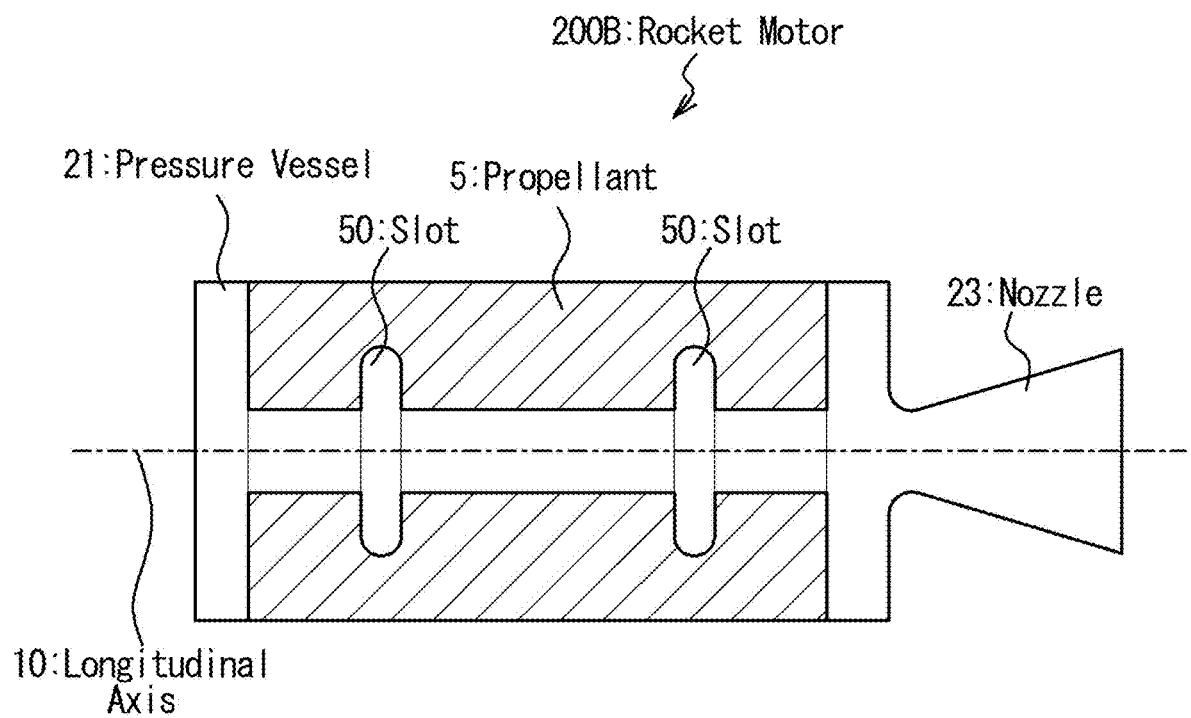
FIG. 3A is a section view illustrating one example configuration of a rocket motor, according to another related art.
Figure 3B:
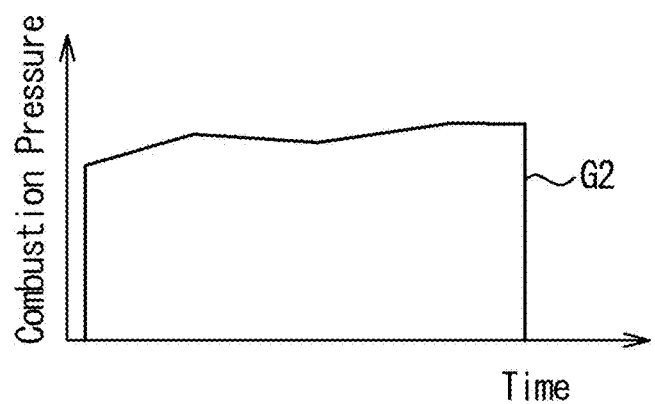
FIG. 3B is a graph illustrating one example of time-dependent changes in the combustion pressure during the operation of the rocket motor of FIG. 3A.

From this viewpoint, the mass of the pressure vessel 21 can be reduced by reducing the maximum combustion pressure. As one approach to achieve this, a recess, such as a slot and a star perforation may be disposed. It is noted that the slot referred herein is a recess disposed on a plane perpendicular to the longitudinal axis 10, and the star perforation is a recess disposed on a plane containing the longitudinal axis 10. Referring to FIG. 3A and FIG. 3B, a description is given of a rocket motor in which slots are disposed.

FIG. 3A is a section view illustrating one example configuration of a rocket motor 200B, according to another related art. The rocket motor 200B of FIG. 3A is acquired by disposing slots 50 in the rocket motor 200A of FIG. 2A. The rocket motor 200B of FIG. 3A, in which the slots 50 are disposed, has a larger surface area of the propellant 5 compared with the rocket motor 200A of FIG. 2A.

FIG. 3B is a graph G2 illustrating one example of time-dependent changes in the combustion pressure of the rocket motor 200B of FIG. 3A during the operation. In the graph G2 of FIG. 3B, the horizontal axis represents the time, and the vertical axis represents the combustion pressure in the pressure vessel 21. In the example of FIG. 3A, the increase rate of the surface area is equal to the increase rate of the combustion area at the start of the combustion. Accordingly, the combustion pressure of the rocket motor 200B of FIG. 3A at the start of the combustion is larger than that of the rocket motor 200A of FIG. 2A. Since the area of the combusting surface varies depending on the shapes of the slots 50 as the combustion proceeds, the rocket motor 200B of FIG. 3A can reduce the difference in the combustion area between the start of the combustion and the end of the combustion, compared with the rocket motor 200A of FIG. 2A with the propellant with the simple cylindrical shape. As a result, the rocket motor 200B of FIG. 3A can reduce the time-dependent changes in the combustion pressure compared to the rocket motor 200A of FIG. 2A.

It is noted that, since provision of star perforations causes a similar effect to the slots 50, no detailed description is given of the case where the star perforations are provided.

In the example of FIG. 3A, the amount of the propellant 5 mountable on the rocket motor 200B is reduced due to the provision of the slots 50. Mounting an increased amount of the propellant 5 is desired to improve the performance of the rocket motor 200B.

Based on the study given above, the inventors have proposed a propellant manufacturing method for leveling the combustion pressure without disposing a recess on the propellant 5 and a propellant manufacturing apparatus using this manufacturing method as discussed in the following. A description is given of a rocket motor thus configured with reference to FIG. 4A and FIG. 4B.

Figure 4A:
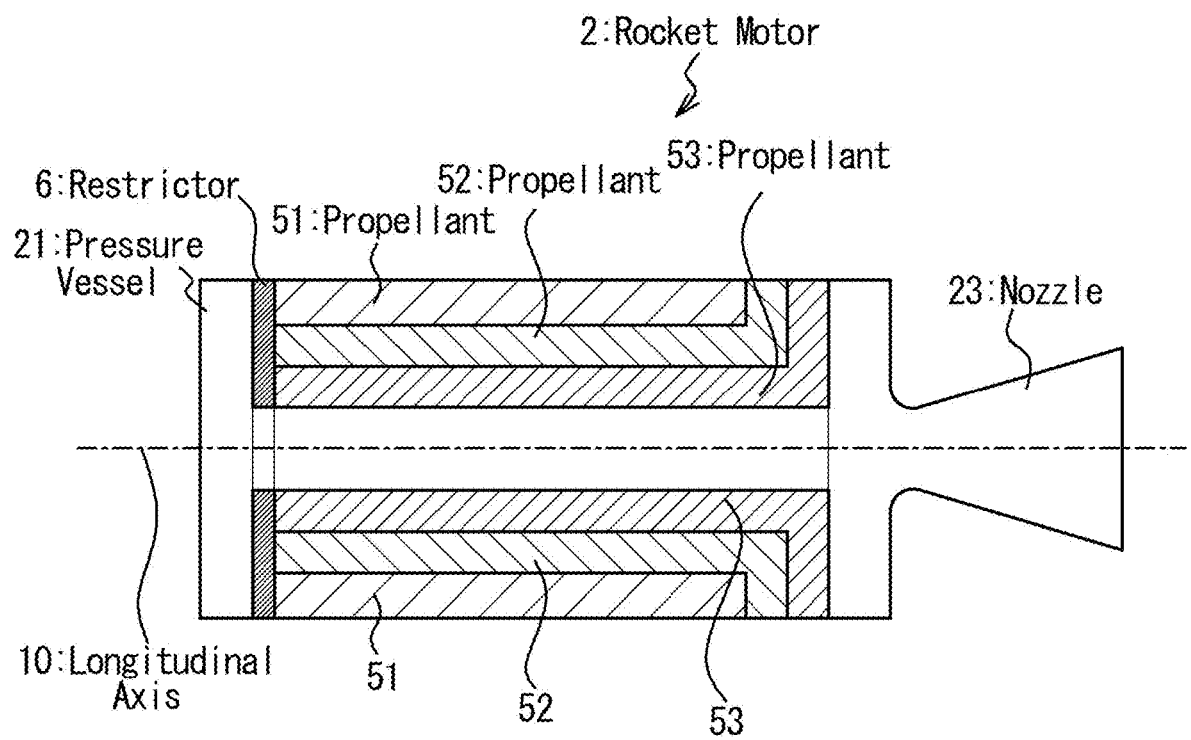
FIG. 4A is a section view illustrating one example configuration of a rocket motor, according to one embodiment.

FIG. 4A is a section view illustrating one example configuration of a rocket motor 2, according to one embodiment. The rocket motor 2 of FIG. 4A may be acquired, for example, by replacing the propellant 5 of the rocket motor 200A of FIG. 2 with three types of propellants 51, 52, and 53 and further adding a restrictor 6. The restrictor 6 is used to prevent combustion on surfaces of the propellants 51, 52, and 53, the surfaces being in contact with the restrictor 6.

The aggregate of the propellants 51, 52, and 53 is shaped in a cylindrical shape, similarly to the propellant 5 of FIG. 2A. In other words, this aggregate has an outer side surface, an inner side surface, an end surface located close to the nozzle 23, and an end surface located close to the ignition device 22. The aggregate is disposed in the pressure vessel 21 and the outer side surface of the aggregate is in contact with the internal wall of the pressure vessel 21.

The restrictor 6 is coupled to the aggregate to cover the end surface located close to the ignition device 22 of the aggregate. Accordingly, when the aggregate of the propellants 51, 52, and 53 is ignited by the ignition device 22, the combustion starts on the inner side surface and the end surface close to the nozzle 23 of the aggregate, while the combustion does not occur on the end surface close to the ignition device 22, which is covered with the restrictor 6, until the final stage of the combustion after the ignition.

Further, the internal wall of the pressure vessel 21 also prevents the combustion of portions of the propellants 51, 52, and 53, the portions being in contact with the internal wall. Accordingly, the combustion does not occur on the outer side surface of the aggregate, which is in contact with the internal wall of the pressure vessel 21.

The first propellant 51 is coupled to the internal wall of the pressure vessel 21. The third propellant 53 is disposed along the inner side surface and the end surface close to the nozzle 23 of the aggregate. The second propellant 52 is disposed between the first propellant 51 and the third propellant 53. A portion of the second propellant 52 and a portion of the third propellant 53 may be in contact with the internal wall of the pressure vessel 21.

The three propellants 51, 52, and 53 have different burning rates. In one example, the burning rate of the first propellant 51 is the lowest among the three propellants 51, 52, and 53 and the burning rate of the third propellant 53 is the highest, while the burning rate of the second propellant 52 is higher than that of the first propellant 51 and lower than that of the third propellant 53.

Figure 4B:
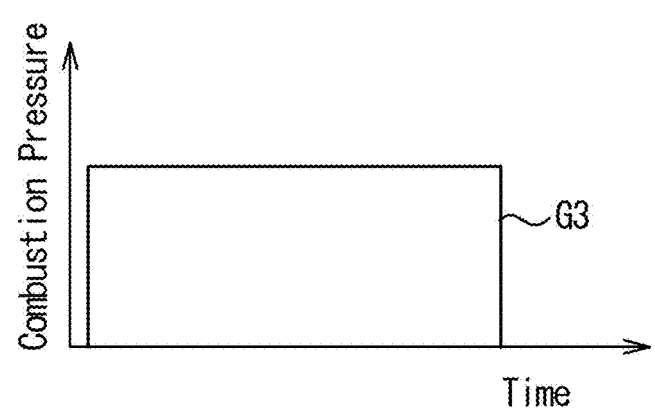
FIG. 4B is a graph illustrating one example of time-dependent changes in the combustion pressure during the operation of the rocket motor of FIG. 4A.

FIG. 4B is a graph G3 illustrating one example of time-dependent changes in the combustion pressure of the rocket motor 2 of FIG. 4A during the operation. In the graph G3 of FIG. 4B, the horizontal axis represents the time, and the vertical axis represents the combustion pressure in the pressure vessel 21. Upon ignition by the ignition device 22, the third propellant 53 first starts to be combusted. At this instance of time, the second propellant 52 and the first propellant 51 do not start combustion upon the ignition because the second propellant 52 and the first propellant 51 are covered with the third propellant 53, the internal wall of the pressure vessel 21, and the restrictor 6.

When the combustion of the third propellant 53 proceeds to completely combust the third propellant 53, the second propellant 52 is exposed and starts to be combusted. At this instance of time, the shape of the aggregate of the second propellant 52 and the first propellant 51, which remain uncombusted, is cylindrical, and the area of the inner side surface of this aggregate is larger than that of the inner side surface of the aggregate of the propellants 51, 52, and 53 before the start of the combustion. Nevertheless, since the burning rate of the second propellant 52 is lower than that of the third propellant 53, the combustion pressure in the pressure vessel 21 is kept substantially unchanged from the combustion pressure at the instance of time when the combustion of the third propellant 53 has started.

When the combustion of the second propellant 52 proceeds to completely combust the second propellant 52, the first propellant 51 is exposed and starts to be combusted. At this instance of time, the shape of the first propellant 51, which remains uncombusted, is cylindrical, and the area of the inner side surface of the first propellant 51 is larger than that of the inner side surface of the aggregate of the second propellant 52 and the first propellant 51 before the start of the combustion of the second propellant 52. Nevertheless, since the burning rate of the first propellant 51 is lower than that of the second propellant 52, the combustion pressure in the pressure vessel 21 is kept substantially unchanged from the combustion pressure at the instance of time when the combustion of the second propellant 52 has started.

As thus discussed, the rocket motor 2 according to this embodiment, in which the area of the inner surface of the aggregate of the propellants 51, 52, and 53 (that is, the area of the combusting surface) increases as the combustion proceeds, allows keeping the combustion pressure in the pressure vessel 21 substantially constant by appropriately setting the burning rates of the first, second, and third propellants 51, 52, and 53.

As a result, the rocket motor 2 according to this embodiment allows reducing the mass of the pressure vessel 21. Furthermore, the rocket motor 2 according to this embodiment, which eliminates the need of providing a recess (such as the slots 50 and star perforations), can incorporate an increased amount of the propellants 51, 52, and 53. In other words, this embodiment can provide a rocket motor 2 with higher performance.

Figure 5:
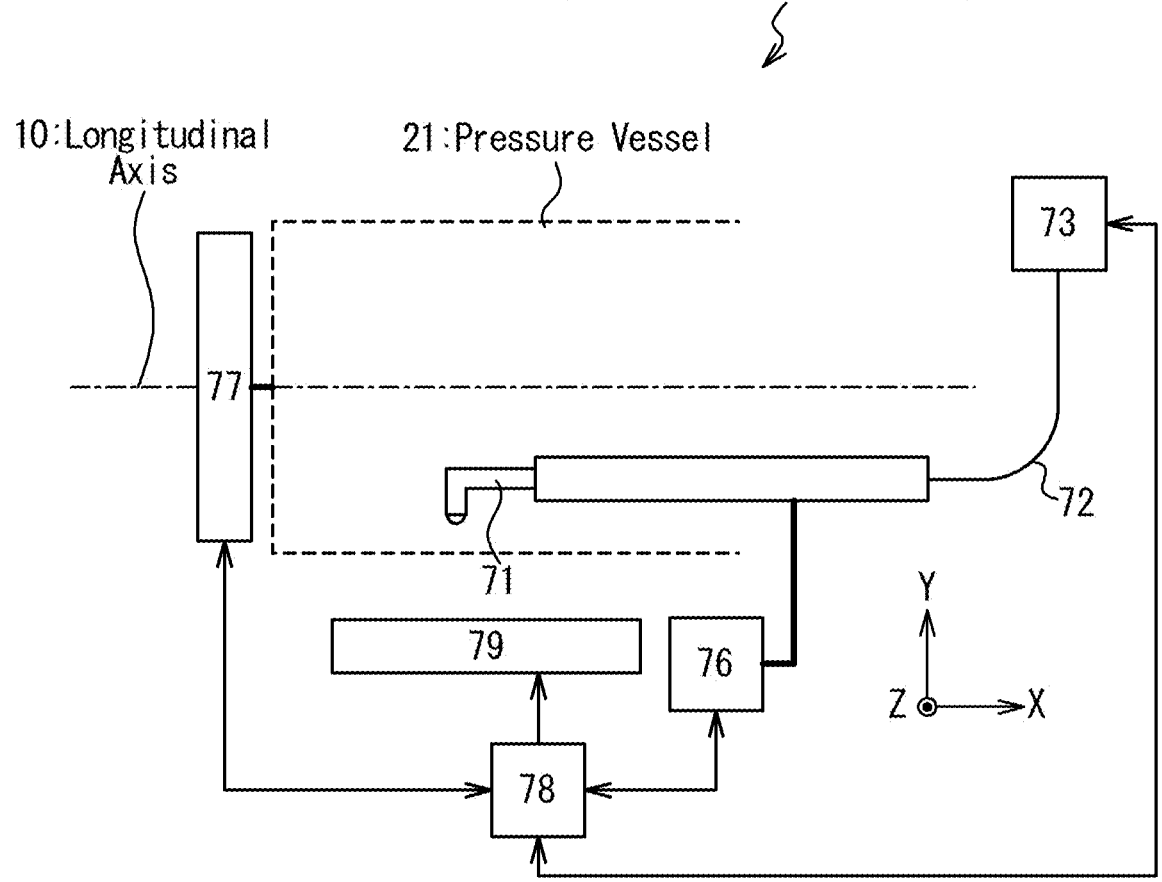
FIG. 5 illustrates one example configuration of a propellant manufacturing apparatus, according to one embodiment.

Referring to FIG. 5, a description is given of an apparatus for manufacturing the propellants 51, 52, and 53 according to this embodiment. FIG. 5 illustrates an example configuration of a propellant manufacturing apparatus 7 according to one embodiment. The propellant manufacturing apparatus 7 of FIG. 5 includes a head 71, a conduit 72, a vessel 73, a head moving device 76, a pressure vessel rotating device 77, a control device 78, and a hardening device 79. The control device 78 may be, for example, a computer including a processing unit, a storage device, an input-output interface, and the like.

The propellant manufacturing apparatus 7 may function as a so-called three-dimensional (3D) printer for additive manufacturing. The propellant manufacturing apparatus 7 is configured to, under control of the control device 78, supply unhardened propellant accumulated in the vessel 73 to the head 71 via the conduit 72 and eject the unhardened propellant from the outlet of the head 71 to deposit in the pressure vessel 21. It is noted that the propellant accumulated in the vessel 73 is not yet hardened, having a proper flowability. The vessel 73 and the conduit 72 may be collectively referred to as a propellant supplying device configured to supply the unhardened propellant to the head 71.

The pressure vessel rotating device 77 is configured to rotate the pressure vessel 21 under control of the control device 78. The pressure vessel rotating device 77 also has the function as a support device configured to support the pressure vessel 21. The axis of rotation around which the pressure vessel 21 is rotated may be coincident with the longitudinal axis 10 of the missile 1. The pressure vessel rotating device 77 can control the relative position between the pressure vessel 21 and the head 71 in the circumferential direction of the pressure vessel 21 by rotating the pressure vessel 21. While the longitudinal axis 10, which is used as the axis of rotation, is illustrated as being directed in the horizontal direction in the example of FIG. 5, this embodiment is not limited to this example. In another example, the pressure vessel 21 may be supported such that the longitudinal axis 10, which is used as the axis of rotation, is directed in the vertical direction.

The head moving device 76 may be configured to move the head 71 to a desired position under control of the control device 78. In the example of FIG. 5, the head 71 may be configured to move in the direction parallel to the longitudinal axis 10 (the X axis direction) in a plane containing the longitudinal axis 10, and/or move in a direction perpendicular to the longitudinal axis 10 (the Y axis direction), that is, the radial direction of the pressure vessel 21. The head moving device 76 can control the relative position between the pressure vessel 21 and the head 71 in the axis-of-rotation direction and the radial direction of the pressure vessel 21 by moving the head 71.

Figure 6:
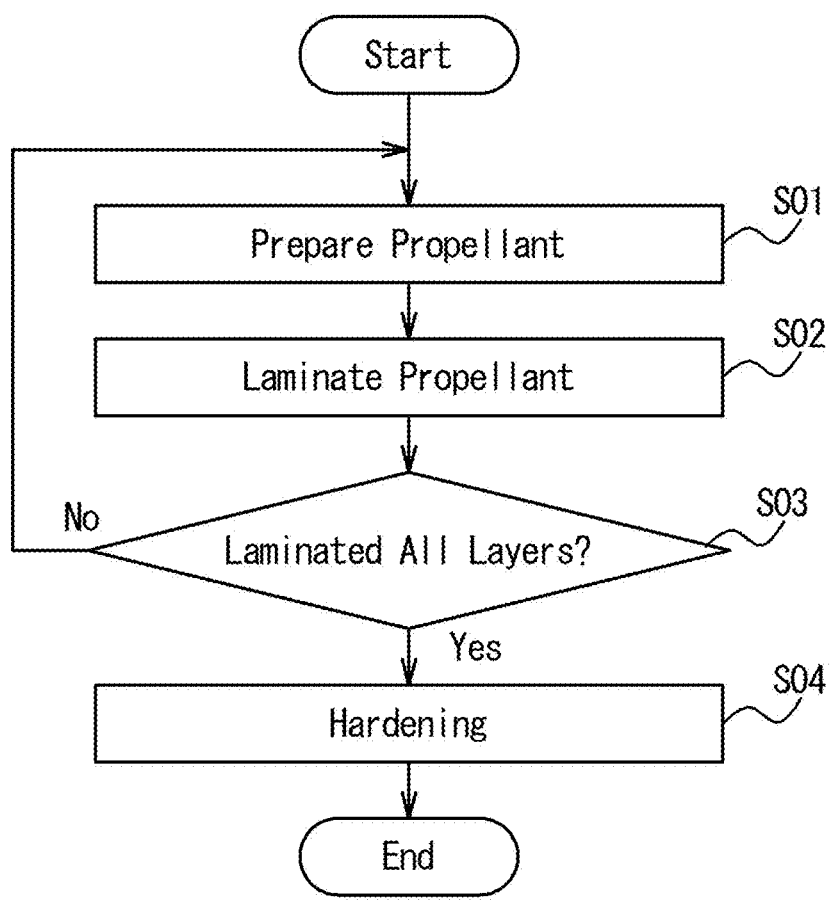
FIG. 6 is a flow chart illustrating one example procedure of a propellant manufacturing method, according to one embodiment.

A description is then given of a method according to which the propellant manufacturing apparatus 7 of this embodiment manufactures the aggregate of the propellants 51, 52, and 53 with reference to FIG. 6. FIG. 6 is a flowchart illustrating one example procedure of the manufacturing method of the propellants 51, 52, and 53, according to one embodiment. The flowchart of FIG. 6 depicts, in total, four steps: first to fourth steps S01 to S04. In the following, as one example, a description is given of the case where the aggregate of the propellants 51, 52, and 53 of FIG. 4A is manufactured.

The propellant manufacturing apparatus 7 may be initialized at the start of the procedure illustrated in the flowchart of FIG. 6. One example of the initialization may include initialization of the control device 78, the head moving device 76, and the pressure vessel rotating device 77. The initialization of the control device 78 may include reading data concerning the shape of propellant to be manufactured and/or reading a program for controlling the relative position between the pressure vessel 21 and the head 71. The initialization of the head moving device 76 may include positioning the head 71 at an initial position based on the program. The initialization of the pressure vessel rotating device 77 may include positioning the pressure vessel 21 at an initial position based on the program.

In the first step S01, the propellant manufacture apparatus 7 prepares the propellants 51, 52, and 53. In the embodiment illustrated in FIG. 7A, the first propellant 51 is first prepared in the vessel 73A. The first propellant 51 prepared in the vessel 73A may reach the outlet of the head 71 via the conduit 72. The second step S02 is performed after the first step S01.

Figure 7A:
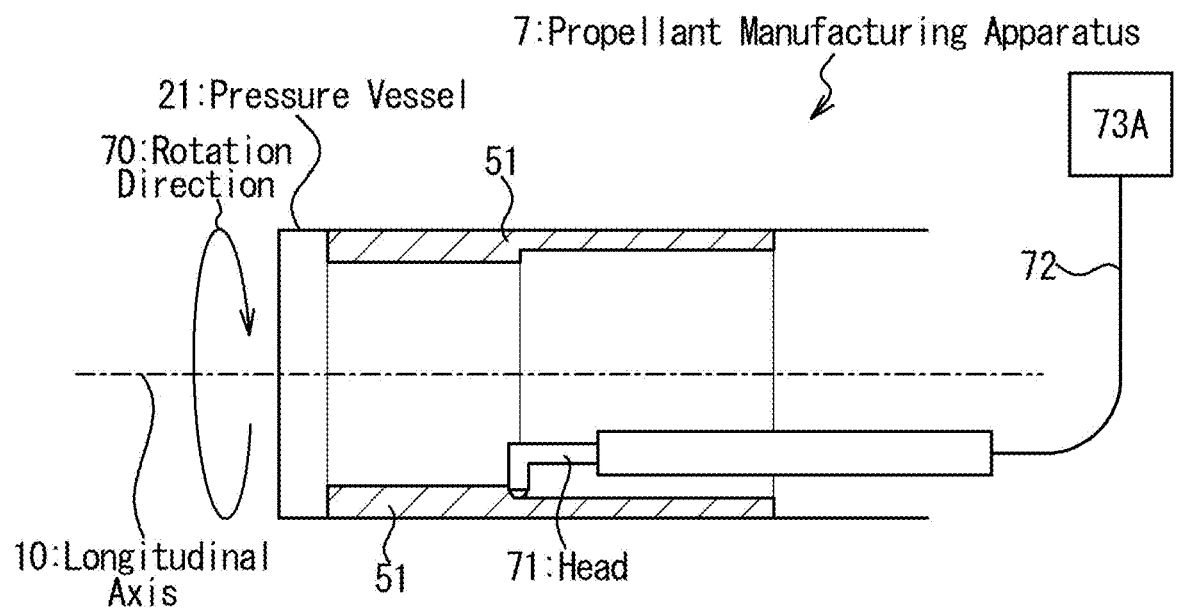
FIG. 7A is a section view illustrating one example state of propellant in one step of a propellant manufacturing method, according to one embodiment.

In the second step S02, the propellant manufacturing apparatus 7 laminates the propellants 51, 52, and 53 in the pressure vessel 21. FIG. 7A is a section view illustrating an example state of the propellant 51 in one step of the manufacturing method of the propellants 51, 52, and 53, according to one embodiment. The propellant manufacturing apparatus 7 rotates the pressure vessel 21 with the pressure vessel rotating device 77 in a rotation direction 70 while the head 71 is ejecting the first propellant 51 onto the internal wall of the pressure vessel 21. This achieves placing the first propellant 51 on the internal wall of the pressure vessel 21 in a ring shape. In other word, the first propellant 51 is placed in a ring-shaped space containing the position of the head 71. The propellant manufacturing apparatus 7 further moves the head 71 in parallel to the longitudinal axis 10 while the head 71 is continuously ejecting the first propellant 51 and the pressure vessel rotating device 77 is continuously rotating the pressure vessel 21. This achieves placing the first propellant 51 in a cylindrical shape in the form of an aggregate of the rings formed on the internal wall of the pressure vessel 21. As the head 71 moves from the position corresponding to the end surface close to the ignition device 22 to the position corresponding the end surface close to the nozzle 23, a first unit layer of the first propellant 51 is placed on the internal wall of the pressure vessel 21.

The propellant manufacturing apparatus 7 then places a second unit layer of the first propellant 51 on the inner side surface of the first unit layer. To achieve this, the propellant manufacturing apparatus 7 moves the head 71 toward the longitudinal axis 10 by the distance corresponding to the thickness of the second unit layer. The pressure vessel rotating device 77 may continue to rotate the pressure vessel 21 during this movement of the head 71. In the movement of the head 71 to the desired position, the head moving device 76 may move the head 71 to the desired position after moving the head 71 to a position which is sufficiently away from the first unit layer. Further, the head 71 may stop ejecting the first propellant 51 until the movement of the head 71 is completed.

After the completion of the movement of the head 71, the propellant manufacturing apparatus 7 deposits the second unit layer on the inner side surface of the first unit layer. Similarly to the first unit layer, the second unit layer can be deposited on the inner side surface of the first unit layer by ejecting the first propellant 51 from the head 71 while the pressure vessel 21 is being rotated and the head 71 is being moved.

The propellant manufacturing apparatus 7 repeatedly deposits unit layers of the first propellant 51 until the first propellant 51 reaches a desired thickness. The number of repetitions may be preset by the program. After the thickness of the first propellant 51 in the radial direction of the pressure vessel 21 reaches the desired thickness, the third step S03 is performed.

In the third step S03, the propellant manufacturing apparatus 7 determines whether deposition of all desired layers is completed. In this step, the result of the determination is "NO" as only the first layer formed of the first propellant 51 has been deposited. In this case, the first step S01 is performed again after the third step S03. The procedure for the case where the result of the determination is "YES" will be described later.

In performing the first step S01 for the second time, the propellant manufacturing apparatus 7 prepares the second propellant 52 in a vessel 73B this time. In other words, the vessel 73A, which is used in the first step S01 of the first iteration, is replaced with the vessel 73B. In this step, the conduit 72 and the head 71 may be exchanged to prevent the different propellants 51 and 52 from being mixed. The second step S02 is performed for the second time after the first step S01 is performed for the second time.

Figure 7B:
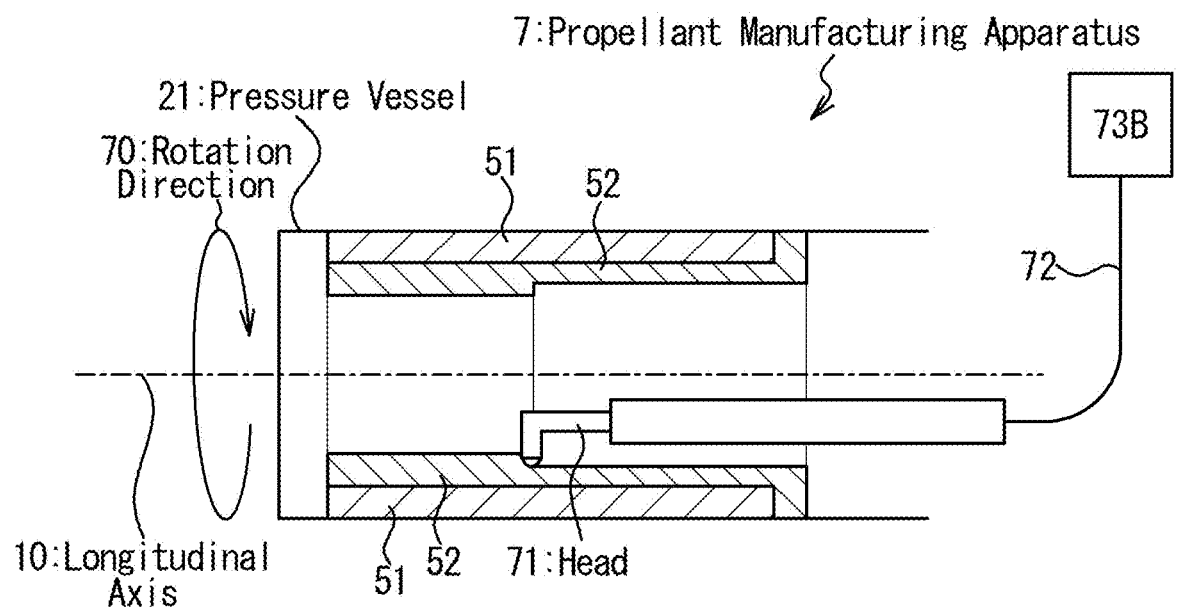
FIG. 7B is a section view illustrating one example state of propellant in one step of the propellant manufacturing method, according to one embodiment.

In performing the second step S02 for the second time, the propellant manufacturing apparatus 7 operates similarly to the case where the second step S02 is performed for the first time. At this time, however, the propellant manufacturing apparatus 7 deposits the second propellant 52 on the surface of the first layer formed of the first propellant 51. FIG. 7B is a section view illustrating one example state of the propellants 51 and 52 in one step of the manufacturing method of the propellants 51, 52, and 53, according to one embodiment. As illustrated in FIG. 7B, the second layer formed of the second propellant 52 includes a cylindrical portion internally in contact with the first layer, which is shaped in a cylindrical shape. As illustrated in FIG. 7B, the second layer may include, in addition to the cylindrical portion, a flange portion that covers the end surface close to the nozzle 23 of the first layer and is in contact with the inner side surface of the pressure vessel 21. It can be said that this flange portion is coupled to the end surface of the cylindrical portion of the second layer. The flange portion may be formed of the second propellant 52.

After the thickness of the second propellant 52 in the radius direction of the pressure vessel 21 reaches a desired thickness, the third step S03 is performed again. At this instance of time, the result of the determination is "NO" again, as a third layer formed of the third propellant 53 is not yet deposited although the first layer formed of the first propellant 51 and the second layer formed of the second propellant 52 have been deposited. Accordingly, the first step S01 is performed for the third time after the third step S03.

In performing the first step S01 for the third time, the propellant manufacturing apparatus 7 prepares the third propellant 53 in a vessel 73C this time. In other words, the vessel 73B used in the first step S01 of the second iteration is replaced with the vessel 73C. In this step, the conduit 72 and the head 71 may be exchanged to prevent the different propellants 52 and 53 from being mixed. The second step S02 is performed for the third time after the first step S01 is performed for the third time.

Figure 7C:
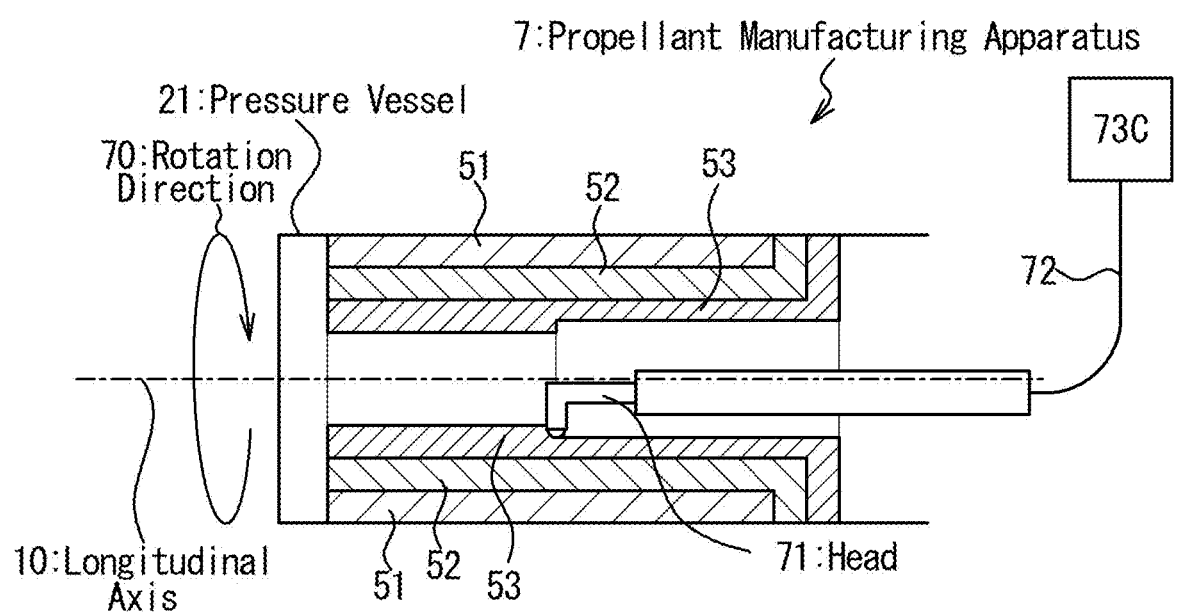
FIG. 7C is a section view illustrating one example state of propellant in one step of the propellant manufacturing method, according to one embodiment.

In performing the second step S02 for the third time, the propellant manufacturing apparatus 7 operates similarly to the case where the second step S02 is performed for the first time and the second time. At this time, however, the propellant manufacturing apparatus 7 deposits the third propellant 53 on the surface of the second layer formed of the second propellant 52. FIG. 7C is a section view illustrating one example state of the propellants 51, 52, and 53 in one step of the manufacturing method of the propellants 51, 52, and 53, according to one embodiment. As illustrated in FIG. 7C, the third layer formed of the third propellant 53 includes a cylindrical portion in contact with the inner side surface of the cylindrical portion of the second layer. Further, as illustrated in FIG. 7C, the third layer may include, in addition to the cylindrical portion, a flange portion disposed in contact with the end surface close to the nozzle 23 of the second layer and further in contact with the inner side surface of the pressure vessel 21. In this case, the flange portion of the third layer may be coupled to the flange portion of the second layer. It can be said that this flange portion is coupled to the end surface of the cylindrical portion of the third layer. This flange portion may be formed of the third propellant 53.

After the thickness of the third propellant 53 in the radius direction of the pressure vessel 21 reaches a desired thickness, the third step S03 is performed for the third time. At this instance of time, the result of the determination is "YES", as all the layers have been already deposited. Accordingly, the fourth step S04 is performed after the third step S03.

In the fourth step S04, the hardening device 79 simultaneously and completely hardens the entireties of the first, second, and third propellants 51, 52, and 53, which have been laminated. This complete hardening is a process of finally hardening the propellants 51, 52, and 53. The complete hardening may be achieved by, for example, heating the propellants 51, 52, and 53. In such embodiments, the hardening device 79 may have the function of heating the propellants 51, 52, and 53 from outside and/or inside of the pressure vessel 21. As a result, the propellants 51, 52, and 53 illustrated in FIG. 4A are acquired in the example illustrated in FIGS. 7A to 7C.

The procedure illustrated in the flowchart of FIG. 6 completes by completing the fourth step S04. It is noted that manufacturing processes of the rest of the rocket motor 2 other than the propellant, which are not directly related to the features of this embodiment, are not illustrated in the flowchart of FIG. 6 and no detailed description thereof is given.

In this embodiment, in which the entireties of the propellants 51, 52, and 53 are completely hardened simultaneously, it is possible to reduce the deterioration of the propellants 51, 52, and 53 potentially caused by the hardening compared with the case where part of the propellants is subjected to hardening multiple times. Accordingly, this embodiment allows manufacturing the propellants 51, 52, and 53 with higher performance.

The propellants 51, 52, and 53 are integrated after being completely hardened. The completely hardened propellants may be referred to as propellant grain.

A restrictor 6 may be disposed on one end of the completely hardened propellants 51, 52, and 53, or on each of the both ends of the same. The restrictor 6 prevents the combustion on portions of the surfaces of the propellants 51, 52, and 53, the portions being in contact with the restrictor 6. According to one variation of this embodiment, the restrictor 6 may be placed on one end of the propellants or on each of the both ends of the propellants before the complete hardening. To facilitate the placement of the restrictor 6, the end close to the ignition device 22 and/or the end close to the nozzle 23 of the pressure vessel 21 may be kept open until the restrictor 6 is placed. In an alternative example configuration, the restrictor 6 may not be disposed on the surfaces of the propellants 51, 52, and 53.

Second Embodiment

The above-given description recites that the first propellant 51, the second propellant 52, and the third propellant 53, which constitute the first layer, the second layer, and the third layer, respectively, are individually prepared and supplied to the head 71. In this embodiment, two types of propellants that have different burning rates are prepared, and three types of propellants are supplied to the head 71 by mixing these two propellants with different ratios. In one example, the second propellant 52 may be prepared by mixing the first propellant 51 and the third propellant 53 at a proper ratio.

Figure 8A:
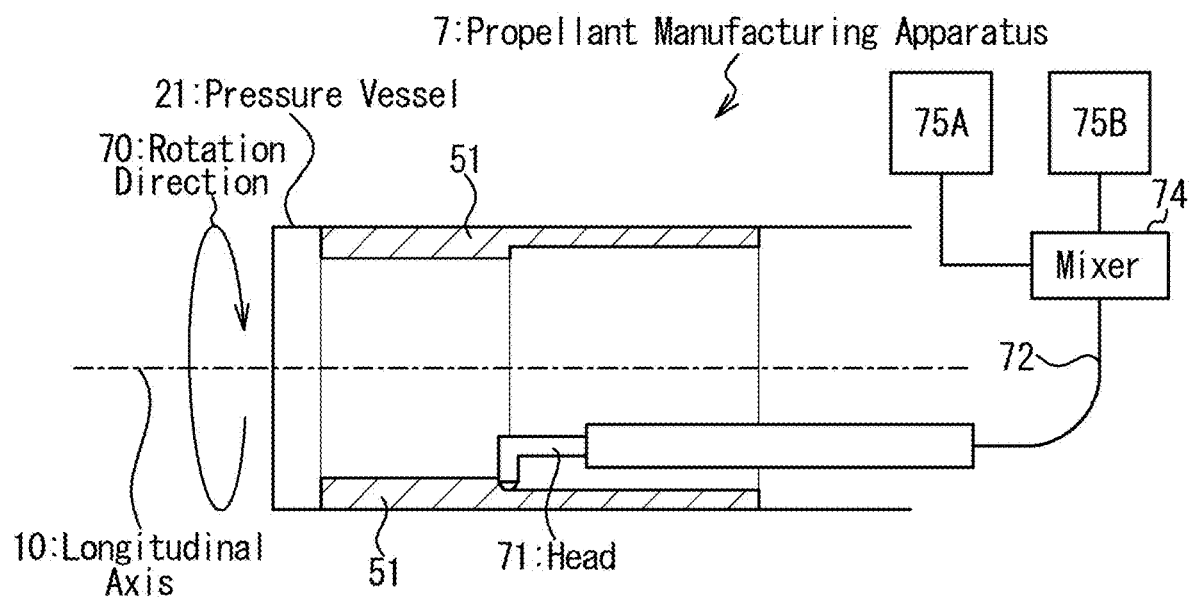
FIG. 8A is a section view illustrating one example state of propellant in one step of a propellant manufacturing method, according to one embodiment.

FIG. 8A is a section view illustrating an example state of the propellant 51 in one step of the manufacturing method of the propellants 51, 52, and 53, according to one embodiment. In this embodiment, as illustrated in FIG. 8A, two vessels 75A and 75B are prepared and two types of propellants that have different burning rates are prepared in these vessels 75A and 75B. A mixer 74 is disposed downstream of the two vessels 75A and 75B. The mixer 74 is configured to produce, for example, propellant having the same burning rate as that of the first propellant 51 by mixing the two types of propellants supplied from the two vessels 75A and 75B, respectively, at a predetermined ratio. The head 71 is connected to the downstream of the mixer 74 via the conduit 72. The vessels 75A, 75B, the mixer 74, and the conduit 72 may be collectively referred to as propellant supplying device.

The same operation as that illustrated in FIG. 7A can be achieved by modifying the propellant manufacturing apparatus 7 as illustrated in FIG. 8A in performing the second step S02 of the flowchart illustrated in FIG. 6 for the first time. In this operation, the mixer 74 may mix the propellants under control the control device 78.

Figure 8B:
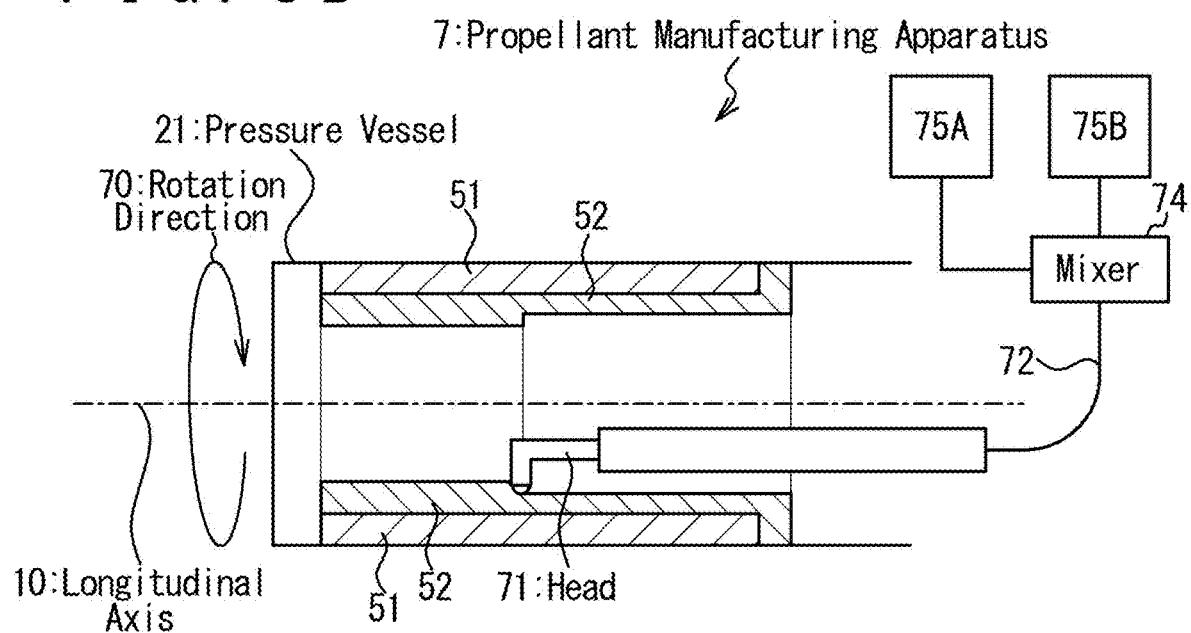
FIG. 8B is a section view illustrating one example state of propellant in one step of the propellant manufacturing method, according to one embodiment.

FIG. 8B is a section view illustrating one example state of the propellants 51 and 52 in one step of the manufacturing method of the propellants 51, 52, and 53, according to one embodiment. The propellant manufacturing apparatus 7 of FIG. 8B is configured similarly to that of FIG. 8A. It is noted however that the ratio with which the mixer 74 mixes the two propellants supplied from the two vessels 75A and 75B is modified. The mixing ratio used in the step illustrated in FIG. 8B is determined such that the resultant propellant acquired by the mixing has the same burning rate as that of the second propellant 52. The same operation as that illustrated in FIG. 7B can be achieved by modifying the propellant manufacturing apparatus 7 as illustrated in FIG. 8B in performing the second step S02 of the flowchart illustrated in FIG. 6 for the second time.

Figure 8C:
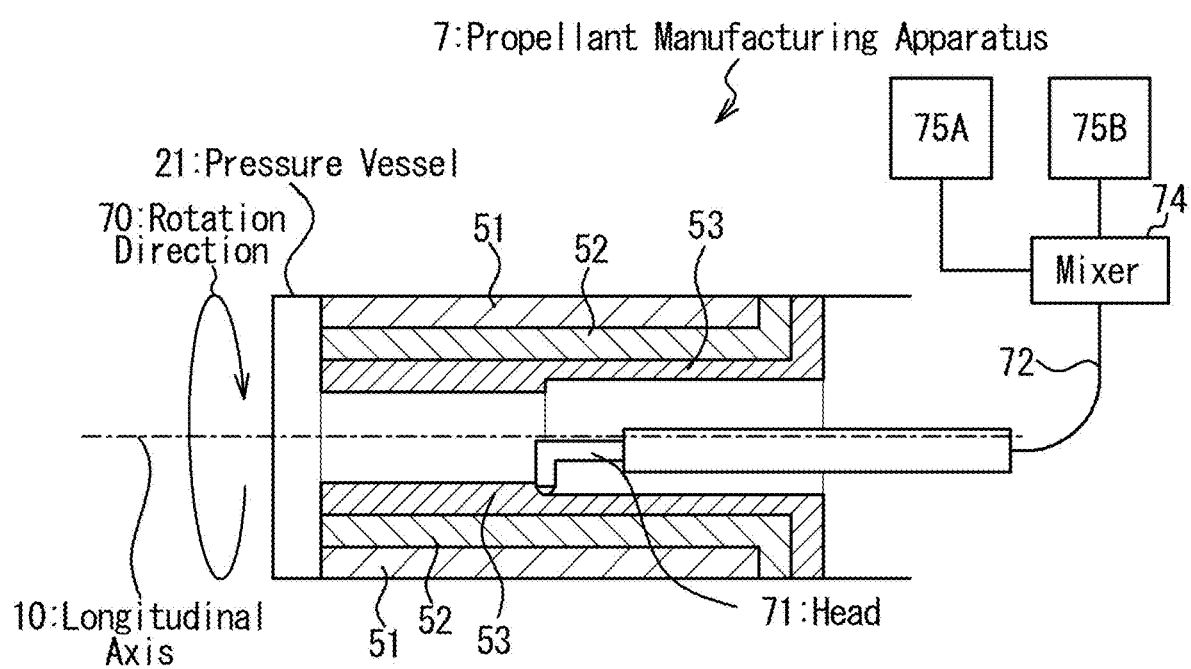
FIG. 8C is a section view illustrating one example state of propellant in one step of the propellant manufacturing method, according to one embodiment.

FIG. 8C is a section view illustrating an example state of the propellants 51, 52, and 53 in one step of the manufacturing method of the propellants 51, 52, and 53, according to one embodiment. The propellant manufacturing apparatus 7 of FIG. 8C is configured similarly to that of FIG. 8A. It is noted however that the ratio with which the mixer 74 mixes the two propellants supplied from the two vessels 75A and 75B is modified. The mixing ratio used in the step illustrated in FIG. 8C is determined such that the resultant propellant acquired by the mixing has the same burning rate as that of the third propellant 53. The same operation as that illustrated in FIG. 7C can be achieved by modifying the propellant manufacturing apparatus 7 as illustrated in FIG. 8C in performing the second step S02 of the flowchart illustrated in FIG. 6 for the third time.

While the description given above recites that the mixer 74 mixes two types of propellants, this embodiment is not limited to this example. In other words, a mixture acquired by mixing three or more propellants with a proper mixing ratio may be supplied to the head 71.

Third Embodiment

While the description given above recites that the propellant grain is manufactured by laminating three different types of propellants 51, 52, and 53 that have different burning rates, this embodiment is not limited to this embodiment. A propellant grain may be manufactured by laminating four or more different types of propellants that have different burning rates. In one example, by depositing different propellants to form respective unit layers, it is possible to manufacture a propellant grain such that the burning rate of the propellant grain substantially continuously changes from the inner side surface to the outer side surface.

Figure 9:
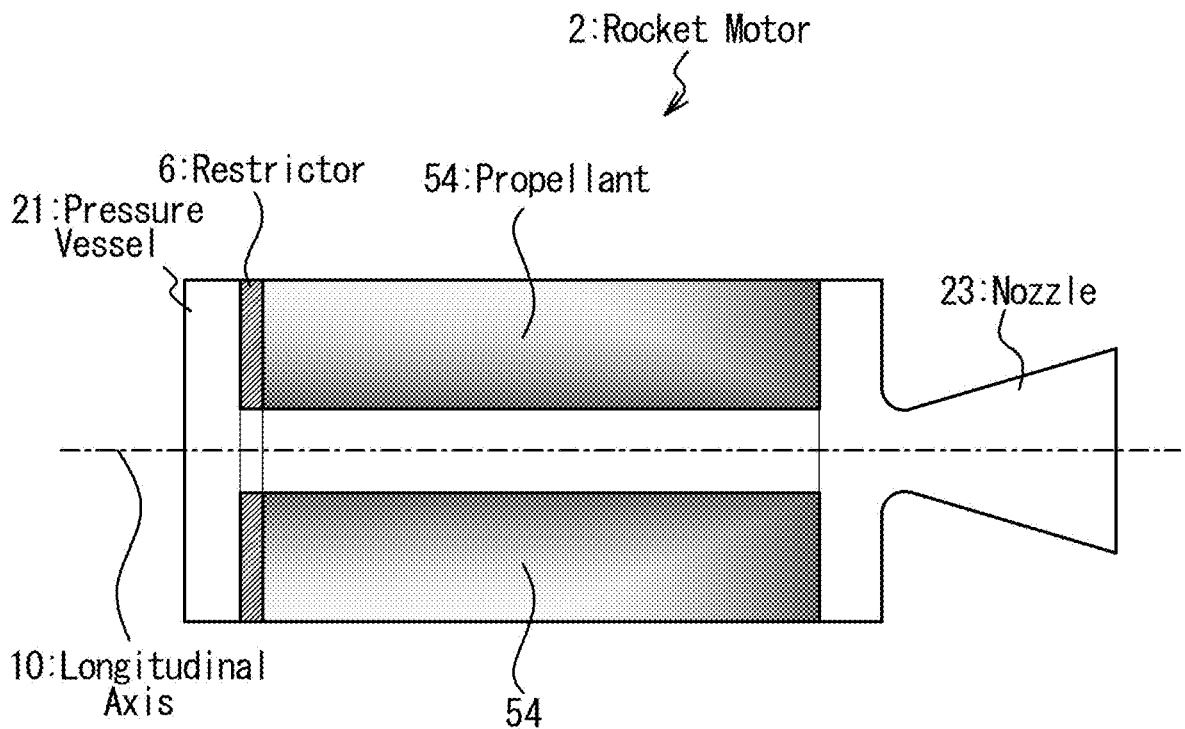
FIG. 9 is a section view illustrating one example configuration of a rocket motor, according to one embodiment.

FIG. 9 is a section view illustrating one example configuration of a rocket motor 2, according to one embodiment.

The rocket motor 2 of FIG. 9 is acquired by replacing the propellants 51, 52, and 53 of the rocket motor 2 of FIG. 4A with propellant 54. In FIG. 9, the burning rate of the propellant 54 is represented by grayscale. A darker shade represents a portion of the propellant 54 with a higher burning rate, while a lighter shade represents a portion of the propellant 54 with a lower burning rate.

In other words, the propellant 54 of FIG. 9 is acquired by laminating four or more types of propellants that have different burning rates in place of the three types of the propellants 51, 52, and 53 illustrated in FIG. 4A. In one example, multiple unit layers respectively containing propellants of different burning rates may be laminated in the order of the burning rates. Other details of the method and apparatus for manufacturing the rocket motor 2 of FIG. 9 are as described in the first embodiment and the second embodiment.

In the rocket motor 2 of FIG. 9, a restrictor 6 is disposed on an end surface close to the ignition device 22 of the propellant 54. Also in this case, the combustion starts upon ignition by the ignition device 22 on the inner side surface and the end surface close to the nozzle 23 of the cylindrical propellant 54, not on the outer side surface coupled to the inner side surface of the pressure vessel 21 and the end surface coupled to the restrictor 6, similarly to the configuration illustrated in FIG. 4A. Propellant with higher burning rate is disposed on the inner side surface and the end surface close to the nozzle 23 of the propellant 54. Further, propellant with lower burning rate is disposed at locations near the outer side surface of the propellant 54 and apart from the end surface close to the nozzle 23 of the propellant 54. Accordingly, the propellant 54 illustrated in FIG. 9 also allows reducing the time-dependent changes in the combustion pressure in the pressure vessel 21, since propellant with higher burning rate is combusted at the start of the combustion at which the area of the combusting surface is smaller and propellant with lower burning rate is then combusted as the combustion proceeds to increase the area of the combusting surface.

Figure 10:
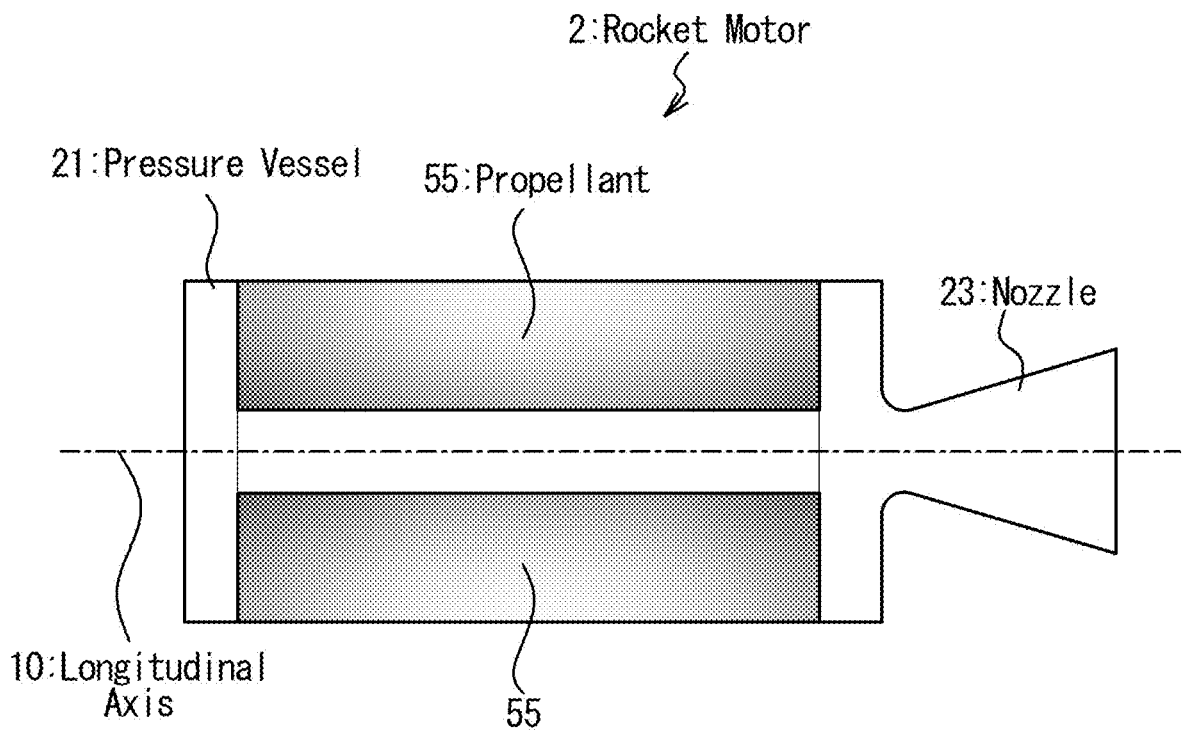
FIG. 10 is a section view illustrating one example configuration of a rocket motor, according to one embodiment.

FIG. 10 is a section view illustrating one example configuration of a rocket motor 2, according to one embodiment. The rocket motor 2 of FIG. 10 is acquired by replacing the propellants 51, 52, and 53 of the rocket motor 2 of FIG. 4A with propellant 55. In FIG. 10, the burning rate of the propellant 55 is represented by grayscale in a similar manner to FIG. 9.

The propellant 55 illustrate in FIG. 10 is formed of an increased number of propellants that have different burning rates, similarly to the propellant illustrated in FIG. 9. It is noted however that, in the example in FIG. 10, each unit layer includes multiple propellants that have different burning rates, differently from those illustrated in FIG. 9 and FIG. 4A. Propellant contained in each unit layer may be shaped in a ring shape that is rotationally symmetric around the longitudinal axis 10, which is defined as the axis of rotation, or shaped in a cylindrical shape formed as an aggregate of such rings, or shaped in multiple rings or cylinders separated from one another in that unit layer. The propellant 55 thus configured can be manufactured by continuously changing the ratio with which the mixer 74 illustrated in FIGS. 8A to 8C mixes the two types of propellants at proper timing while each unit layer is deposited.

In the rocket motor 2 of FIG. 10, no restrictor 6 is disposed on the end surfaces of the propellant 55. In this case, the combustion starts upon ignition by the ignition device 22 on the inner side surface and both the end surfaces of the cylindrical propellant 55, not on the outer side surface coupled to the inner side surface of the pressure vessel 21. Propellant with higher burning rate is disposed on the inner side surface and both the end surfaces of the propellant 55. Further, propellant with lower burning rate is disposed at locations near the outer side surface of the propellant 55 and apart from the inner side surface and both the end surfaces. Accordingly, the propellant 55 illustrated in FIG. 10 also allows reducing the time-dependent changes in the combustion pressure in the pressure vessel 21, since propellant with higher burning rate is combusted at the start of the combustion at which the area of the combusting surface is smaller and propellant with lower burning rate is combusted as the combustion proceeds to increase the area of the combusting surface.

Although the invention invented by the inventors has been specifically described based on the embodiments in the above, this invention is not limited to the above-described embodiments, and various modifications may be made without departing from the scope. The features described in the embodiments may be arbitrarily combined as long as the combination causes no technical inconsistency.

Propellant manufacturing methods described in the respective embodiments may be represented, for example, as follows.

(1) A propellant manufacturing method in a first aspect is a method for a propellant which includes a propellant grain having a first surface on which combustion starts upon ignition and a second surface coupled to a wall surface that prevents the combustion. The manufacturing method includes: placing a portion of first propellant having a first burning rate in a first space containing a first position on the second surface; and placing a portion of second propellant having a second burning rate higher than the first burning rate in a second space containing a second position on the first propellant. The manufacturing method further includes placing a portion of third propellant having a third burning rate higher than the second burning rate in a third space containing a third position on the first surface. The manufacturing method further includes completing the propellant grain by simultaneously and completely hardening the first propellant, the second propellant, and the third propellant.

The propellant manufacturing method in the first aspect provides an advantage that the entireties of the three propellants having different burning rate can be hardened completely and simultaneously after the propellants are placed.

(2) In a second aspect, the propellant manufacturing method in the first aspect further includes depositing a first layer containing the first propellant along the wall surface. The propellant manufacturing method in the second aspect further includes depositing a second layer containing the second propellant on the first layer. The propellant manufacturing method in the second aspect further includes depositing a third layer containing the third propellant on the first surface.

The propellant manufacturing method in the second aspect provides an advantage that the propellant grain can be manufactured by using a so-called additive 3D printer.

(3) In a third aspect, in relation to the propellant manufacturing method in the second aspect, the wall surface includes an inner side surface of the pressure vessel at least a portion of which is cylindrical. The propellant grain is shaped cylindrical and has an outer side surface contained in the second surface and an inner side surface contained in the first surface, the outer side surface of the propellant grain being in contact with the inner side surface of the pressure vessel. At least a portion of the first layer is cylindrical and has an outer side surface and an inner side surface, and at least a portion of the outer side surface of the first layer forms at least a portion of the outer side surface of the propellant grain. At least a portion of the third layer is cylindrical and has an outer side surface and an inner side surface, and at least a portion of the inner side surface of the third layer forms at least a portion of the inner side surface of the propellant grain.

The propellant manufacturing method in the third aspect provides an advantage that it is possible to prepare a cylindrical propellant grain coupled to the inner side surface of the pressure vessel.

(4) In a fourth aspect, in relation to the propellant manufacturing method in the third aspect, depositing the second layer includes depositing the second layer such that a surface of the first propellant is in contact with the wall surface and the second propellant. In the fourth aspect, depositing the third layer includes depositing the third layer such that a surface of the second propellant is covered with the wall surface, the first propellant, and the third propellant.

The propellant manufacturing method in the fourth aspect provides an advantage that the propellant grain can be manufactured such that the third layer formed of the third propellant, the second layer formed of the second layer, and the first layer formed of the first propellant are combusted in this order.

(5) In a fifth aspect, the propellant manufacturing method in any one of the second to fourth aspects further includes placing a restrictor such that the restrictor is coupled to the first propellant to cover an end surface of the first propellant, wherein the wall surface includes a surface of the restrictor.

The propellant manufacturing method in the fifth aspect provides an advantage that it is possible to control combustion of the propellant grain by placing the restrictor.

(6) In a sixth aspect, the propellant manufacturing method in any one of the third to fifth aspect further includes forming a flange portion containing the second propellant, the flange portion being coupled to one end surface of the second layer that is shaped cylindrical, to one end surface of the first layer that is shaped cylindrical, and to the inner side surface of the pressure vessel.

The propellant manufacturing method in the sixth aspect provides an advantage that the combustion of the propellant grain can be controlled by providing the flange portion.

(7) In a seventh aspect, the propellant manufacturing method in any one of the third to sixth aspects further includes preparing at least one of the first propellant, the second propellant, and the third propellant by mixing propellants that have different burning rates.

The propellant manufacturing method in the seventh aspect provides an advantage that it is possible to produce propellant having a desired burning rate by mixing a plurality of propellants that have different burning rates.

(8) In an eighth aspect, in relation to the propellant manufacturing method in any one of the third to seventh aspects, depositing the first layer includes laminating a plurality of unit layers respectively containing propellants that have different burning rates from each other in an order of the burning rates.

The propellant manufacturing method in the eighth aspect provides an advantage that it is possible to manufacture a propellant grain such that the burning rate substantially continuously varies from the inner side surface to the outer side surface.

(9) In a ninth aspect, in relation to the propellant manufacturing method in any one of the third to eighth aspects, depositing the first layer includes laminating a plurality of unit layers, each of the plurality of unit layers containing propellants that have different burning rates from each other.

The propellant manufacturing method in the ninth aspect provides an advantage that it is possible to place multiple propellants that have different burning rates from each other in desired shapes.

Propellant manufacturing apparatuses described in the respective embodiments may be represented, for example, as follows.

In a first aspect, a propellant manufacturing apparatus is configured to manufacture a propellant which includes a propellant grain having a first surface on which combustion starts upon ignition and a second surface to be coupled to a wall surface that prevents the combustion. The propellant manufacturing apparatus in the first aspect includes a support device, a propellant supplying device, a head, a head moving device, a control device, and a hardening device. The support device is configured to support the wall surface. The propellant supplying device is configured to supply unhardened propellants. The head is configured to eject the unhardened propellants. The head is configured to place first propellant contained in the unhardened propellants in a space containing a position on the wall surface and place second propellant and third propellant contained in the unhardened propellants in a space containing a predetermined position under control of the control device, the second propellant having a burning rate different from that of the first propellant, the third propellant having a burning rate different from those of the first propellant and the second propellant. The head moving device is configured to move the head to adjust a position of the head with respect to the wall surface. The control device is configured to control the support device, the head, and the head moving device. The hardening device is configured to complete the propellant grain by simultaneously and completely hardening the entireties of the first propellant, the second propellant, and the third propellant.

The propellant manufacturing apparatus in the first aspect provides an advantage that the entireties of the three propellants having different burning rate can be hardened completely and simultaneously after the propellants are placed.

The wall surface may be a surface of a restrictor or an inner side surface of a pressure vessel. The restrictor and the pressure vessel have the function of preventing combustion of portions of the propellants, the portions being in contact with the restrictor and the pressure vessel, respectively.

(2) In a second aspect, a propellant manufacturing apparatus is configured similarly to the propellant manufacturing apparatus in the first aspect. In the propellant manufacturing apparatus in the second aspect, the wall surface contains an inner side surface of a pressure vessel coupled to the second surface of the propellant grain. The inner side surface of the pressure vessel contains a cylindrical inner side surface that is rotationally symmetric around an axis of rotation. The support device is configured to control a relative position between the pressure vessel and the head in a circumferential direction of the pressure vessel by rotating the pressure vessel around the axis of rotation under control of the control device. The head moving device is configured to control the relative position between the pressure vessel and the head in a radial direction of the pressure vessel and a direction of the axis of rotation under control of the control device.

The support device may be a pressure vessel rotating device. The support device may have the function of supporting and rotating the pressure vessel. The propellant manufacturing apparatus in the second aspect provides an advantage that the propellant manufacturing apparatus can operate as a so-called 3D printer by combining the control to rotate the pressure vessel and the control to move the head.

In a third aspect, in relation to the propellant manufacturing apparatus in the first or second aspect, the propellant supply device further includes a plurality of vessels and a mixer. The vessels are configured to respectively supply propellants that have different burning rates. The mixer is configured to produce propellant that has a desired burning rate by mixing the plurality of propellants with a predetermined ratio under control of the control device.

The propellant manufacturing apparatus in the third aspect provides an advantage that it is possible to prepare propellant having a desired burning rate by mixing a plurality of propellants that have different burning rates.

What is claimed is:

1. A manufacturing method for a propellant which comprises a propellant grain having a first surface on which combustion starts upon ignition and a second surface to be coupled to a wall surface that prevents the combustion,
placing a portion of first propellant having a first burning rate in a first space containing a first position on the second surface;
placing a portion of second propellant having a second burning rate higher than the first burning rate in a second space containing a second position on the first propellant;
placing a portion of third propellant having a third burning rate higher than the second burning rate in a third space containing a third position on the first surface; and
completing the propellant grain by simultaneously and completely hardening entireties of the first propellant, the second propellant, and the third propellant.

2. The manufacturing method according to claim 1, further comprising:
depositing a first layer containing the first propellant along the wall surface;
depositing a second layer containing the second propellant on the first layer; and
depositing a third layer containing the third propellant on the first surface.

3. The manufacturing method according to claim 2, wherein the wall surface comprises an inner side surface of a pressure vessel at least a portion of which is cylindrical,
wherein the propellant grain is shaped cylindrical and has an outer side surface contained in the second surface and an inner side surface contained in the first surface, the outer side surface of the propellant grain being in contact with the inner side surface of the pressure vessel,
wherein at least a portion of the first layer is cylindrical and has an outer side surface and an inner side surface, and at least a portion of the outer side surface of the first layer forms at least a portion of the outer side surface of the propellant grain, and
wherein at least a portion of the third layer is cylindrical and has an outer side surface and an inner side surface, and at least a portion of the inner side surface of the third layer forms at least a portion of the inner side surface of the propellant grain.

4. The manufacturing method according to claim 3, wherein depositing the second layer comprises depositing the second layer such that a surface of the first propellant is in contact with the wall surface and the second propellant, and
wherein depositing the third layer comprises depositing the third layer such that a surface of the second propellant is covered with the wall surface, the first propellant, and the third propellant.

5. The manufacturing method according to claim 3, wherein the wall surface includes a surface of a restrictor, and
wherein the manufacturing method further comprises placing the restrictor such that the restrictor is coupled to an end surface of the first propellant.

6. The manufacturing method according to claim 3, further comprising forming a flange portion containing the second propellant, the flange portion being coupled to one end surface of the second layer that is shaped cylindrical, to one end surface of the first layer that is shaped cylindrical, and to the inner side surface of the pressure vessel.

7. The manufacturing method according to claim 3, further comprising preparing at least one of the first propellant, the second propellant, and the third propellant by mixing propellants that have different burning rates.

8. The manufacturing method according to claim 3, wherein depositing the first layer comprises laminating a plurality of unit layers respectively containing propellants that have different burning rates from each other in an order of the burning rates.

9. The manufacturing method according to claim 3, wherein depositing the first layer comprises laminating a plurality of unit layers, and
wherein each of the plurality of unit layers contains propellants that have different burning rates from each other.

10. A propellant manufacturing apparatus for manufacturing a propellant grain having a first surface on which combustion starts upon ignition and a second surface to be coupled to a wall surface that prevents the combustion, the propellant manufacturing apparatus comprising:
a support device configured to support the wall surface;
a propellant supplying device configured to supply unhardened propellants;
a head configured to eject the unhardened propellants;
a head moving device configured to move the head to adjust a position of the head with respect to the wall surface; and
a control device configured to control the support device, the head, and the head moving device,
wherein the head is configured to:
place first propellant contained in the unhardened propellants in a space containing a position on the wall surface; and
place second propellant and third propellant contained in the unhardened propellants in a space containing a predetermined position under control of the control device, the second propellant having a burning rate different from that of the first propellant, the third propellant having a burning rate different from those of the first propellant and the second propellant, and
wherein the propellant manufacturing apparatus further comprises a hardening device configured to complete the propellant grain by simultaneously and completely hardening entireties of the first propellant, the second propellant, and the third propellant.

11. The propellant manufacturing device according to claim 10, wherein the wall surface comprises an inner side surface of a pressure vessel coupled to the second surface of the propellant grain,
- wherein the inner side surface of the pressure vessel comprises a cylindrical inner side surface that is rotationally symmetric around an axis of rotation,
- wherein the support device is configured to control a relative position between the pressure vessel and the head in a circumferential direction of the pressure vessel by rotating the pressure vessel around the axis of rotation under control of the control device,
- wherein the head moving device is configured to control the relative position between the pressure vessel and the head in a radial direction of the pressure vessel and a direction of the axis of rotation under control of the control device.

12. The propellant manufacturing device according to claim 10, wherein the propellant supplying device comprises:
- a plurality of vessels configured to supply a plurality of propellants that have different burning rates; and
- a mixer configured to produce propellant that has a desired burning rate by mixing the plurality of propellants with a predetermined ratio under control of the control device.

* * * * *